(12) United States Patent
Loce et al.

(10) Patent No.: US 6,297,889 B1
(45) Date of Patent: Oct. 2, 2001

(54) LOGIC-BASED IMAGE PROCESSING METHOD

(75) Inventors: Robert P. Loce, Webster; Michael Branciforte, Rochester; Ying-wei Lin, Penfield, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/218,688

(22) Filed: Dec. 22, 1998

(51) Int. Cl.[7] ............................. G06K 15/02; G06K 9/44; G06K 9/46; G06T 5/30
(52) U.S. Cl. ........................... 358/1.9; 382/257; 382/275
(58) Field of Search ................. 382/256, 257, 382/258, 308, 254, 260, 275, 274; 358/1.9, 448, 463

(56) References Cited

U.S. PATENT DOCUMENTS

| 4,791,679 | 12/1988 | Barski et al. . |
| 5,048,109 | 9/1991 | Bloomberg et al. . |
| 5,128,698 | 7/1992 | Crawford et al. . |
| 5,450,208 | 9/1995 | Murata ................................ 358/296 |
| 5,483,351 | 1/1996 | Mailloux et al. .................... 358/298 |
| 6,111,593 | * 8/2000 | Henderson et al. ................. 347/115 |
| 6,201,551 | * 3/2001 | Loce et al. ........................... 345/442 |
| 6,275,304 | 8/2001 | Eschbach et al. .................... 358/1.9 |

FOREIGN PATENT DOCUMENTS

0624848 * 11/1994 (EP) .............................. G06F/15/68

OTHER PUBLICATIONS

Lin et al., "Method and Apparatus for Compensation of Blooming Artifacts", Application No. 09/219,276, filed Dec. 22, 1998 (D/95493).

Eschbach et al., "Automatic Enhancement of Print Quality Based on Feature Size", Application No. 09/219,734, filed Dec. 22, 1998 (D/98699).

* cited by examiner

Primary Examiner—Scott Rogers
(74) Attorney, Agent, or Firm—Christopher D. Wait

(57) ABSTRACT

A method for processing digital images to be displayed, stored, or printed, to eliminate blooming and other artifacts. The system utilizes morphological processes to isolate and modify image structures susceptible to marking process artifacts and then combines the modified image structures with the input image to produce a printable image that may be rendered on a given printer.

23 Claims, 9 Drawing Sheets

LOGIC-BASED IMAGE PROCESSING METHOD

CROSS REFERENCE/INCORPORATION BY REFERENCE

The following related applications are hereby cross referenced and incorporated by reference for their teachings:

"USING MULTIPLE DIGITALLY-PRODUCED EXPOSURE LEVELS TO COMPENSATE FOR LASER ABSORPTION IN READ IMAGE-ON-IMAGE XEROGRAPHY," Henderson et al., U.S. Pat. No. 6,111,593.

"METHOD AND APPARATUS FOR COMPENSATION OF BLOOMING ARTIFACTS," Lin et al., application Ser. No. 09/219,276, filed Dec. 22, 1998.

"AUTOMATIC ENHANCEMENT OF PRINT QUALITY BASED ON FEATURE SIZE," Eschbach et al., application Ser. No. 09/219,734, filed Dec. 22, 1998.

This invention relates generally to a logic-based image processing method for size dependent filtering and more particularly to logic-based image processing to compensate for marking process characteristics such as blooming, and size and orientation dependent artifacts in a xerographic engine.

BACKGROUND OF THE INVENTION

The present invention contemplates the use of logic-based, morphological operations to isolate image structures requiring size dependent modification, such as features that are susceptible to blooming when reproduced by an output device such as a color xerographic image-on-image, or any other type, of marking engine. The blooming condition, resulting from the need to overexpose the photoreceptor for latter-developed colors that are imaged through an existing colorant, does not lend itself to correction by simple adjustment of xerographic parameters or simple color correction.

Heretofore, a number of patents and publications have disclosed logic-based image processing, the relevant portions of which may be briefly summarized as follows:

Crawford, J. L., and C. D. Elzinga, "Improved Output Quality by Modulating Recording Power," *SPSE 41st Annual Conference*, May 22–26, 1988, Arlington, Va. Discusses utilizing thickened strokes while performing smoothing, and the use of logical mask processing.

Loce, R. and E. Dougherty, *Enhancement and Restoration of Digital Documents*, SPIE Press, Bellingham Wash., 1997. Provides much tutorial information oil logic-based image filtering and relevant morphological operations—Section 1.5 teaches the basic relevant operations.

"Method and Apparatus for Digital Image Darkness Control Using Quantized Fractional Pixels," Inventors: R. Bracco, et al., Ser. No. 09/072,122 (May 5, 1997 provisional application, February 1998 actual filing), D/97210P, Barski, L., and R. Gaborski, "Image Character Enhancement using a Stroke Strengthening Kernel," U.S. Pat. No. 4,791,679, Dec. 13, 1988. Teaches how a character stroke is strengthened by processing video image data with a 16×16 kernel, and moving the kernel one pixel at a time through the image. For each pixel position, sections of the kernel, are selectively filled with black pixels in proportion to the number of black pixels in each section, in accordance with a set of predetermined rules.

Crawford, J., and J. Cunningham, "Boldness Control in an Electrophotographic Machine," U.S. Pat. No. 5,128,698, Jul. 7, 1992. Control over the placement of an image edge location on the photoconductor of an electrophotographic machine as providing for a range of discharge levels for edge picture elements (PELS) which vary from greater than, to less than, that level used for fully discharged PELS. Such control is achieved independently of machine parameter control by altering edge PEL illumination intensity in accordance with data representing desired edge PEL intensity as the photoconductor sensitivity changes. A system for measuring and controlling the fully discharged PEL level establishes a measure of photoconductor sensitivity and is used for enabling the selection of current edge PEL intensity. Used control of marking process parameters, as opposed to modifying the digital image.

Mailloux, L., and T. Robson, "Dilation of Images without Resolution Conversion for Printer Characteristics," U.S. Pat. No. 5,483,351, Jan. 9, 1996. An image compensation system which provides dilation or erosion of image features using halfbitting or fullbitting in the rendition of bitmap images, especially on a write-white printer. A region of pixels of an image is isolated which includes two or more correctable pixel locations. A set of state determination rules, based on the formation of pixels in the isolated region, is used to determine a corrected binary pixel state for each of the correctable pixels. Corrections for one correctable pixel may be considered in the state determination rules for adjacent correctable pixels. A single enhanced output pixel is provided for each image input pixel, thereby preserving the original image resolution. Performing enhancements on multiple input pixels. Teaches employment of "halfbits" to thicken strokes by a factional amount while maintaining printer resolution.

Murata, K., "Image Processing Method and Apparatus," U.S. Pat. No. 5,450,208, Sep. 12, 1995. The image processing apparatus for smoothing edges in a reproduced image includes an image data generating circuit for generating image data including a specified pixel and a plurality of pixels surrounding the specified pixel; a sub-pixel data generating circuit for dividing the specified pixel included in the image data into N sub-pixels, for detecting the condition of the specified pixel and the condition of the plurality of pixels surrounding the specified pixel included in the image data by matching the image data with a plurality of predetermined patterns, and for generating sub-pixel data for determining the number and position of sub-pixels to be exposed of the N sub-pixels, based on the condition of the specified pixel and the condition of the plurality of pixels surrounding the specified pixel; and supplying circuit for supplying the sub-pixel data to exposure circuit which makes exposure. The sub-pixel data generating circuit generates sub-pixel data for exposing M sub-pixels of the N subpixels, when the specified pixel is detected to be an exposed pixel which requires no exposure correction, where M is smaller than N. The invention here relates to an image processing method and an image processing apparatus for smoothing jagged edges of characters, etc., and for stably reproducing thin lines and isolated dots, so as to achieve an image reproduction of high quality and to achieve an ideal tone characteristic by correcting the tone characteristic of digital halftone images.

SUMMARY OF THE INVENTION

Image-on-image (IOI) marking engines, where images are sequentially exposed and developed, typically produce a "blooming" artifact in the later-imaged colors (e.g., magenta and cyan). Unfortunately, the blooming artifact does not easily lend itself to correction merely by adjusting the controls or setpoints of the xerographic engine. On the other hand, it has been discovered that it is possible to employ an image processing solution that will reduce the blooming artifact to an acceptable level. A morphological, or logic-based, image processing method may be employed to compensate for the loss of shadow detail associated with an observed blooming artifact.

In an image-on-image xerographic marking engine, the magenta and cyan separations are typically developed over the yellow separation. In IOI, the exposure level for magenta and cyan is therefore increased, compared to the yellow separation exposure level, to compensate for the transmission loss when the latter separation exposure occurs through the developed yellow image (yellow toner). However, in regions of the photoreceptor surface where there is no yellow toner, the exposure level of the latter separations will likely be too high—resulting in excessive line growth and loss of shadow detail called blooming. Blooming causes "holes" within a latent image to fill in with toner, which in turn results in the loss of shadow detail in halftoned images.

Although it may be possible to correct the exposure intensity oil a pixel-bypixel basis, the level of registration accuracy and hardware complexity necessary to enable such a correction is not readily achievable in commercial equipment. Similarly, other methods may be utilized to minimize the blooming artifacts. One such method, an object of the present invention, is the use of logic-based non-linear or (morphological) methods to adjust the image bitmap in a manner that corrects for the loss of shadow detail. More specifically, the present invention is directed to the enlargement of certain features (e.g., holes) within an image. Enlargement allows tile area about the "holes" to be exposed and developed, or printed, without filling in the holes. Generally, the invention first isolates the regions of the image most likely to be affected by blooming using a logic-based "sifting" operation, then processes the regions to compensate for blooming, and merges or links the processed image with the original image to produce a digital image that will be blooming artifact reduced when printed with an image-on-image marking engine.

While blooming contributes to a particular size dependant artifact, other marking process attributes contribute to other size dependent artifacts. For instance, a marking process may print with narrow dark lines that are too thin, or wide dark lines that are too thin, or lines of a particular width in a given orientation are too thin or too thick. Some combination of size and orientation dependent artifacts may occur. A key aspect of the present invention is the generalized process of size and orientation dependent filtering for compensation of such artifacts, or for generation of a preferred rendition. This generalized operation may be thought of as a sieving operation, where image features of a particular size and orientation are sieved into classes, each class is modified, and the modified feature is input to the final processed image.

Another aspect of the invention is based on the recognition of the problem of blooming artifacts that appear in a display or other marking engine like an image-on image xerographic printing system. More particularly, the invention utilizes image processing techniques to compensate for the blooming artifacts. The techniques employ logic-based, morphological filters to identify structures susceptible to blooming and other printing artifacts and then modify the structures to compensate for those artifacts before the digital image is rendered.

In yet another aspect of the invention, in addition to compensation for marking process characteristics, the present invention performs size and orientation filtering to produce an image that may produce a preferred rendition, possibly for some psychophysical reason or preference.

It will be well understood by those skilled in the art that the compensated image may be written not only to a printing device or marking engine, but may also be written to a display device or to a storage device for subsequent retrieval and use.

In accordance with yet another aspect of the present invention, there is provided a method for processing a digital image prior to printing the image, including the steps of isolating regions of the digital image most likely to be affected by blooming or other size-dependent marking artifacts, modifying the isolated regions to compensate for those artifacts; and merging the modified image features with unmodified image features in the digital image to produce an output digital image that is artifact free when printed using an marking engine, such as an image-on-image device.

In accordance to the present invention, there is provided a method for processing a digital image prior to printing the image on a given marking engine, including: isolating regions of the digital image most likely to be affected by an undesirable printing characteristic; producing a modified image by modifying the isolated regions to compensate for the undesirable printing characteristic; and merging the modified image with the digital image to produce an output digital image that is artifact free when printed using the given marking engine.

In the alternative, there is disclosed a method for processing a digital input image prior to printing the image on a given marking engine, including the steps of: isolating features that are not to be subject to a particular modification, modifying the remainder of the image with a morphological filter, and merging together the modified and unmodified features. For example, suppose it is necessary to thin most features of an image to compensate for blooming. Fine foreground feature regions of the digital input image would be adversely affected by such a compensation operation. In this case, a morphological filter is used to isolated the fine foreground filters, and a second morphological filter, such as an erosion is used to perform the compensation on the remaining image features. Then a subsequent, merging operation is performed to combine the unmodified fine foreground features with the compensated image features, thereby producing an output digital image that is artifact free when printed using the given marking engine.

These techniques can be implemented with a machine that prints color images from digital image data, including digital printers such as laser printers and facsimile machines. These techniques may also be utilized for displays or to images which are subsequently stored for later use. The technique described above is advantageous because it is efficient and can be accomplished using programmable image processing components. It is also flexible and can be adapted to compensate for any of a number of image structures that may result in visually perceptible printing artifacts.

Figure 1:
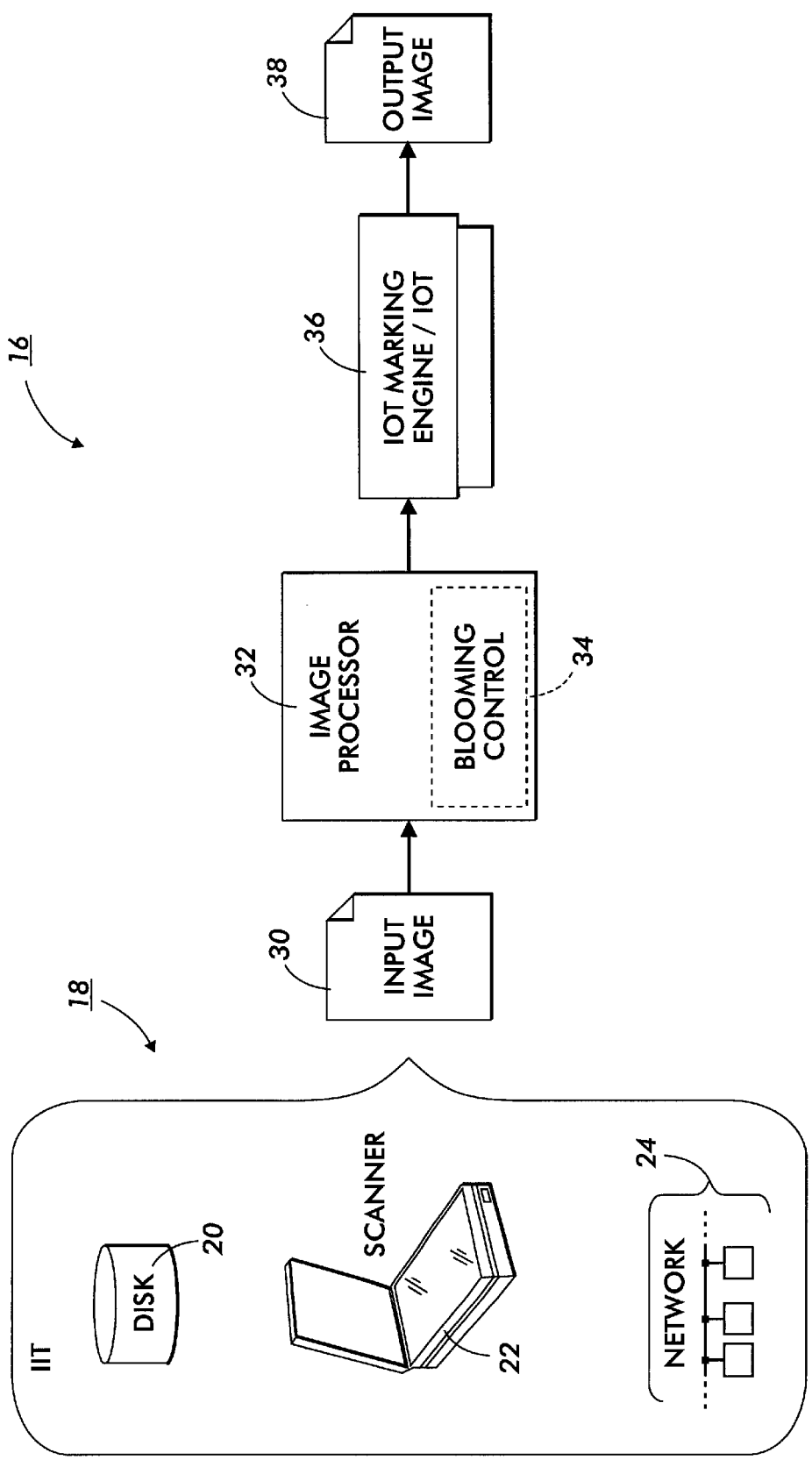
FIG. 1 is a generalized, schematic illustration of a printing system embodying the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

An "image" is a pattern of physical light. An image may include characters, words, and text as well as other features such as graphics. An image may be divided into "segments" or "regions", each of which is itself an image. A region of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel. A "pixel" is the smallest segment of an image whose value is indicated in an item of data defining the image. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color form" of an image, the binary form, gray scale form, and color form each being a two-dimensional array defining an image.

An operation performs "image processing" when it operates on an item of data that relates to part of an image. A "morphological" or "logic-based" operation operates using logical operators (e.g., AND, OR, INV, NOT) applied to a digital image. In particular, the logic operations are typically applied in association with a "structuring element" such as an aperture having a predefined shape or other set of characteristics.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "version" of a first image is a second image produced using an item of data defining the first image. The second image may be identical to the first image, or it may be modified, such as by image processing operations.

An "image input device" (IIT) is a device that can receive an image and provide an item of data defining a version of the image. A "scanner" is an image input device that receives an image by a scanning operation, such as by scanning a hardcopy document. An "image output device" (IOT) is a device that can receive an item of data defining an image and provide the image as a visual output. A "xerographic marking engine" is an image output device that provides the output image in hardcopy document form.

A number of morphological operations map a source image onto an equally sized destination image according to a rule defined by a pixel pattern called a structuring element (SE). The SE is defined by a center location and a number of pixel locations, each having a defined value (ON or OFF for the binary case, with Grey-scale morphology all intermediate levels are allowed). The pixels defining the SE do not have to be adjacent each other. The center location need not be at the geometrical center of the pattern; indeed it need not even be inside the pattern.

"Erosion" is a morphological operation wherein a given pixel in the destination image is turned ON if and only if the result of superimposing the SE center on the corresponding pixel location in the source image results in a match between all ON pixels in the SE and On pixels in the underlying pixels in the source image.

"Dilation" is a morphological operation wherein a given pixel in the source image being ON causes the SE to be written into the destination image with the SE center at the corresponding location in the destination image.

"Opening" is a morphological operation that can be represented as an erosion followed by a dilation. The result is to replicate the SE in the destination image at each location in which it fits within the source image.

"Closing" is a morphological operation that may be represented as a dilation followed by an erosion. It may also be thought of as an opening performed on the background of an image.

Turning to FIG. 1, depicted therein is a generalized, schematic illustration of a printing system embodying the present invention. In printing system 16 (which includes digital reprographic systems) a digital image is initially obtained from an image input terminal or IIT 18. IIT 18 may be any device suitable for generating or storing a digital image for reuse, including for example, a storage device 20 such as a magnetic disk, a scanner or similar digital imaging device 22 (e.g., digital camera), or a computer or similar networked image composition device 24.

Digital input image 30, having been obtained from IIT 18, is passed to all image processor 32 where it is processed in accordance with pre-programmed instructions. Image processor 32 may be any suitable hardware device, particularly including those devices designed for digital signal processing. Preferably, however, image processor 32 is a programmable hardware device capable of operating on the input image data in a timely fashion to meet the throughput requirements of the IOT that it supports. Image processor 32 also contains blooming control logic 34 (hardware and/or software) that will be described in further detail with respect to the following figures.

The output of image processor 32, in the form of a processed digital image, is preferably passed to a marking engine or IOT 36. In a preferred embodiment, IOT 36 is an image-on-image, xerographic engine as characterized above. Simply put, the marking engine exposes and develops sequential color separations (for example: yellow, magenta and cyan) one on top of the other. Such a system inherently requires that for any colors that are formed as a combination of two primary colors, there must be repeated exposures of certain regions of the photoreceptor in order to develop the color image region. Once exposed and developed, the image on a photoconductive member (not shown) is transferred and permanently affixed to a substrate, represented as output print 38.

Figure 2:
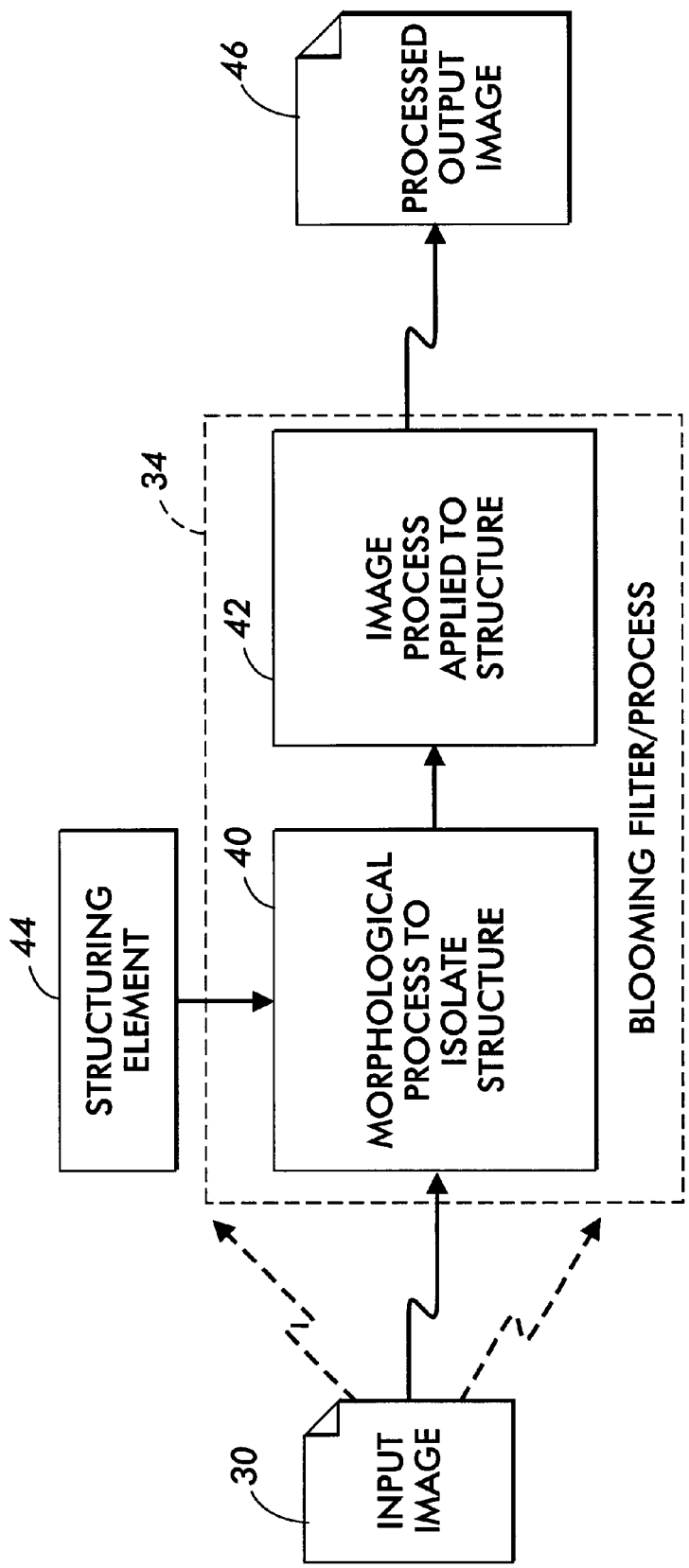
FIG. 2 is a block diagram showing particular detail of the filter/processing components within the printing system of FIG. 1.

Referring to FIG. 2 there is shown particular detail of the filter/processing components within the printing system of FIG. 1. In particular, blooming filter/processor 34 is indicated as including a morphological or logic-based isolation operation 40 and an image processing operation 42. Furthermore, morphological isolation operation 40 receives as input not only the input image 30, but at least one structuring element 44. Exemplary examples of structuring elements will be described below in the description of FIGS. 7 and 9. Those skilled in the art of image processing will recognize the need for a structuring element in the logic-based operations of a blooming filter/processor. Although it is possible to represent the blooming filter/processor as its individual component operational elements, the following description will simply characterize the operations as filter/process 34.

The morphological or logic-based operations of block 40 are intended to identify or isolate particular structures within a digital image. For example, the structures could be lines or holes that need to be further processed to avoid the appearance of blooming artifacts and other undesirable marking process characteristics. Other examples might include, filiform, and filigree as found in the background or foreground of an image; sharp features such as the serifs found in various fonts, or the need to adjust or enlarge ink traps of various fonts. Emphasis may be made of horizontal or vertical lines, or lines which lay in the direction of the marking process direction, or as either parallel or perpendicular to the marking process direction. Determination of which structures are isolated is accomplished by the choice of one or more structuring elements 44. Once isolated, the pixels representing the structure and possibly its surrounding, are then processed in accordance with an image processing operation specifically intended for the structure. For example, a morphological operation may be employed to identify single-pixel holes within an image. Because blooming causes such holes to be filled by the IOI marking process, the image processing operation to be performed would preferably be an erosion operation that would erode the area surrounding the hole, hence slightly expand the size of a hole. Morphological operations such as erosion, dilation, opening, and closing, are well known and discussed, for example, in U.S. Pat. No. 5,048,109 to Bloomberg, incorporated herein by reference. Once processed in accordance with the image processing of operation 42, a processed output image 46 is generated and provided for transmission to a print engine, for further processing.

Figure 3:
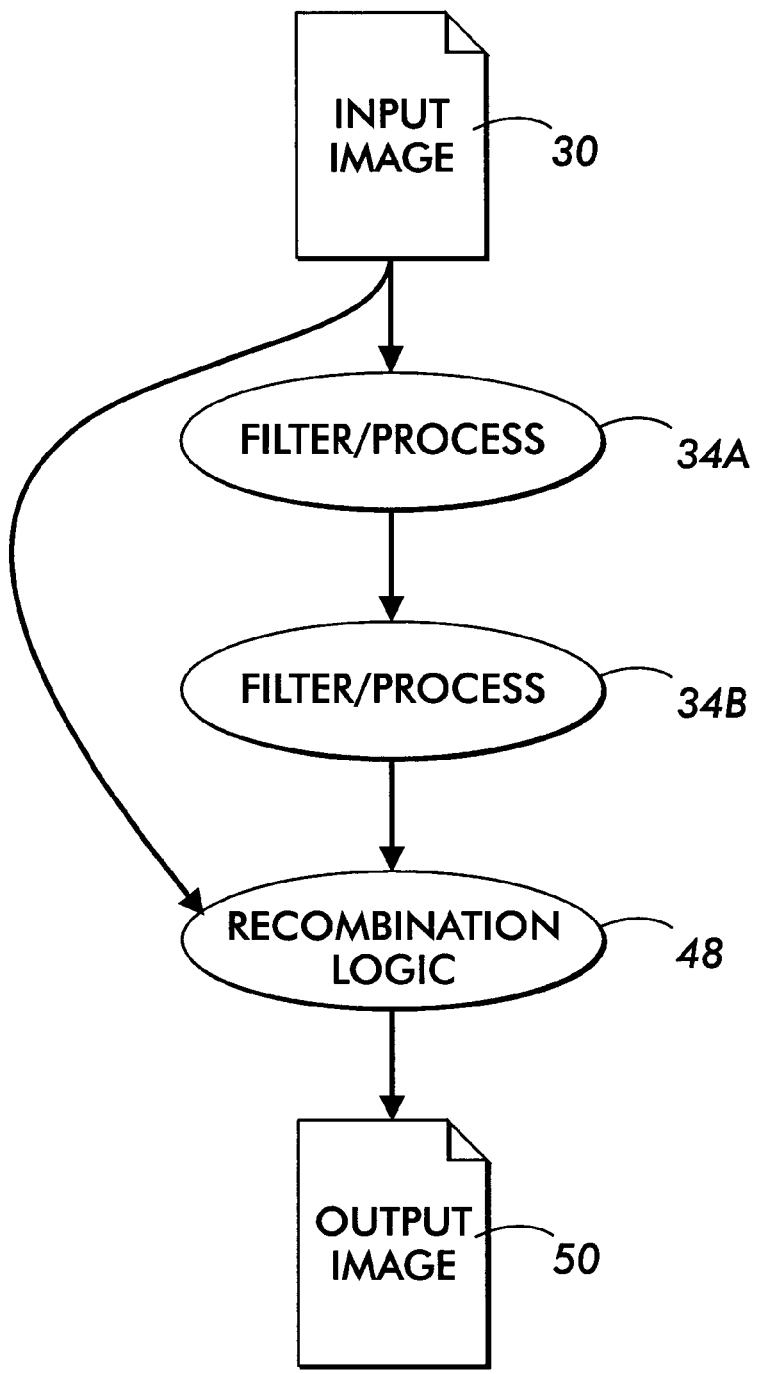
FIGS. 3 and 4, respectively, illustrate serial and parallel embodiments of the present invention.
Figure 4:
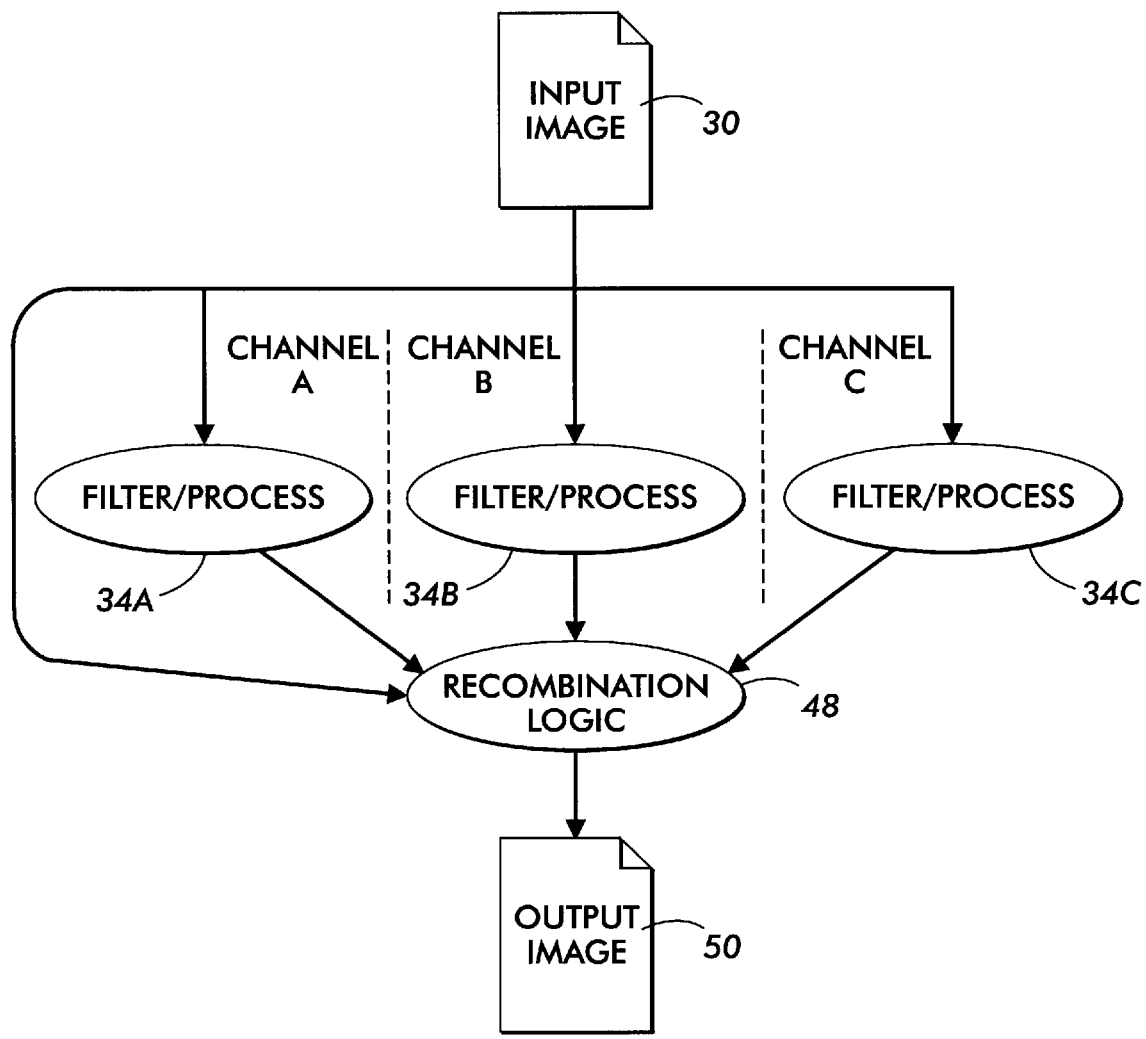

Considering FIGS. 3 and 4, the figures respectively illustrate serial and parallel embodiments of the present invention. FIG. 3 illustrates a serialized flow of input image data through multiple filter/process operations 34A, B, ultimately being 15 recombined by recombination logic 48, which is typically Boolean logic, in order to generate a printable output image 50. FIG. 4 is a 3-channel representation of a parallel filter/process embodiment, were the isolation and processing operations occur concurrently in filter/process operations 34A, B and C, before the outputs thereof are recombined by recombination logic 48.

Figure 5:
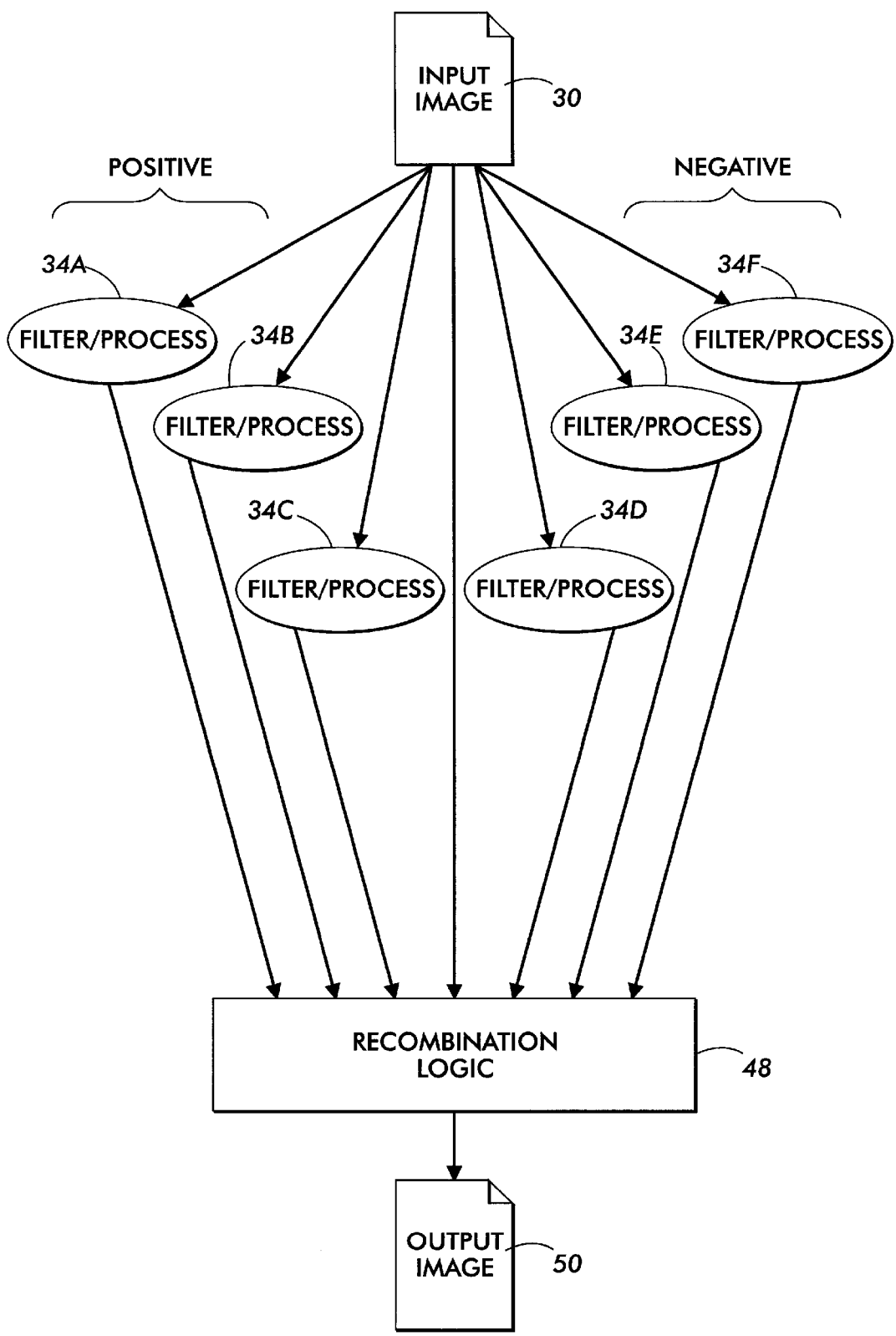
FIG. 5 is a generalized block diagram representing a processing system suitable for processing both positive and negative image structures.

FIG. 5 is a generalized block diagram representing a processing system suitable for processing concurrently both positive and negative image structures. The need to process both positive and negative structures arises as a result of the blooming effect. While a hole (a negative image structure where no image is exposed/developed) may be susceptible to being filled in by blooming, it is also possible for a positive foreground structure within the image (e.g., a 1-pixel wide line) to be undesirably expanded by blooming. As represented by FIG. 5, there may be a plurality of filter/process operations (34A–F) to identify and process particular structures of interest. Some of the filter/process operations may be directed to positive image structures (34A–34C), whereas others may be directed to negative image structures (34D–34F). Again, the outputs of each filter/process operation are recombined, in combination with the input image data in a recombination logic process 48, to produce a final output image 50 that compensates for the blooming effects.

Referring now to combination FIGS. 6 & 7 and 8 & 9, there will be explained two exemplary embodiments of the present invention, designed to eliminate particular characteristics of blooming found in image-oil-image marking engines. Note that the open circle symbol denotes "open" the closed circle symbol denotes "close" and the triangle symbol denotes "difference".

Figure 6:
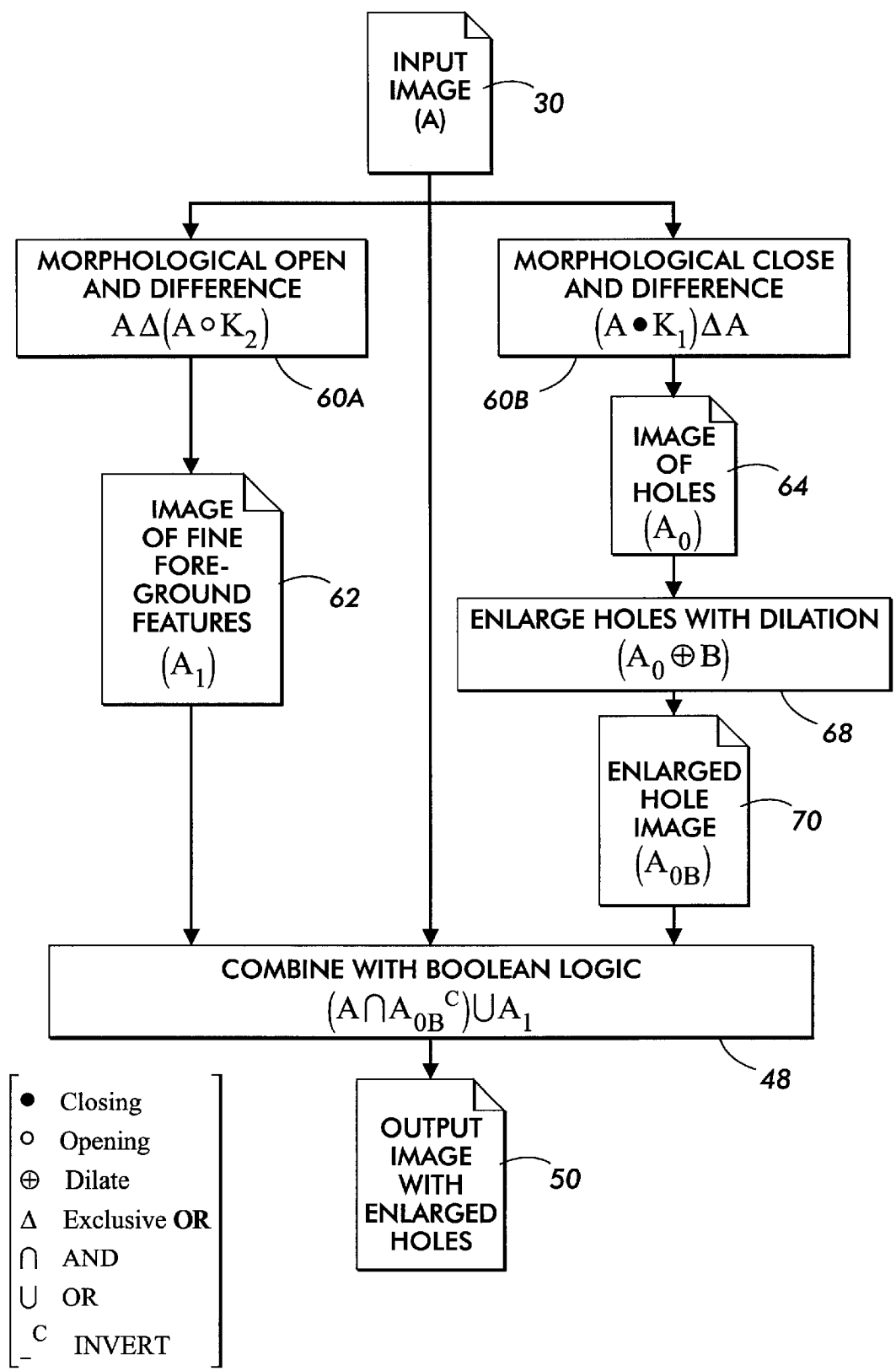
FIG. 6 illustrates an exemplary embodiment of the present invention designed to isolate fine foreground image features and hole structure thereby eliminating undesirable marking characteristics and blooming artifacts found in marking engines.

FIG. 6 illustrates a method for the enlargement of holes to prevent the loss of shadow detail. Specifically, input image 30 is first processed in accordance with a logic-based or morphological operation 60A,B that is designed to employ "opening" (60A) and "closing" (60B) so as to separate both the holes and the fine foreground features from other structures within the image. As a result, the fine foreground structure image 62 is left after an "open" and difference operation, whereas the hole image 64 remains after a "close" and difference operation. The image of holes 64 is subsequently processed by an erosion or dilation operation 68 (dilation in the present example due to the given embodiment representing a hole with 1 value at this stage) so as to produce an enlarged hole image 70. The enlarged hole image 70 is then logically recombined, using recombination logic 48, with the fine foreground structure image 62 and original input image 30, so as to produce all output image 50 with enlarged holes.

Figure 7:
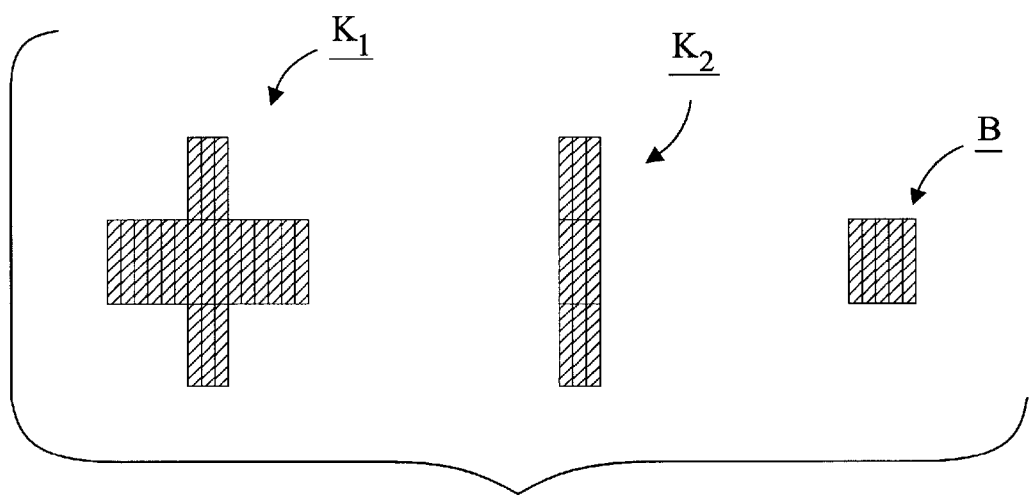
FIG. 7 illustrates the structuring elements required for the operation of the invention as embodied in FIG. 6.

FIG. 7 illustrates the three logic-based structures employed to isolate the various image structures. The FIG. 7 structuring elements $K_1$, $K_2$, and B, are depicted as pixel groupings. $K_1$ is the structure used with the close operation to isolate holes, as represented logically by the equation $(A \bullet K_1) \triangle A$. $K_2$ is the structure used with the open operation to separate fine foreground structure as represented by the equation $A \triangle (A \circ K_2)$. Similarly, B is the structure employed to dilate the holes as represented by the logic equation $A_0 \oplus B$. Thus, when used in combination with the process of FIG. 6, the FIG. 7 structuring elements enable the isolation of holes and fine foreground features prior to hole growth in the digital image.

Figure 8:
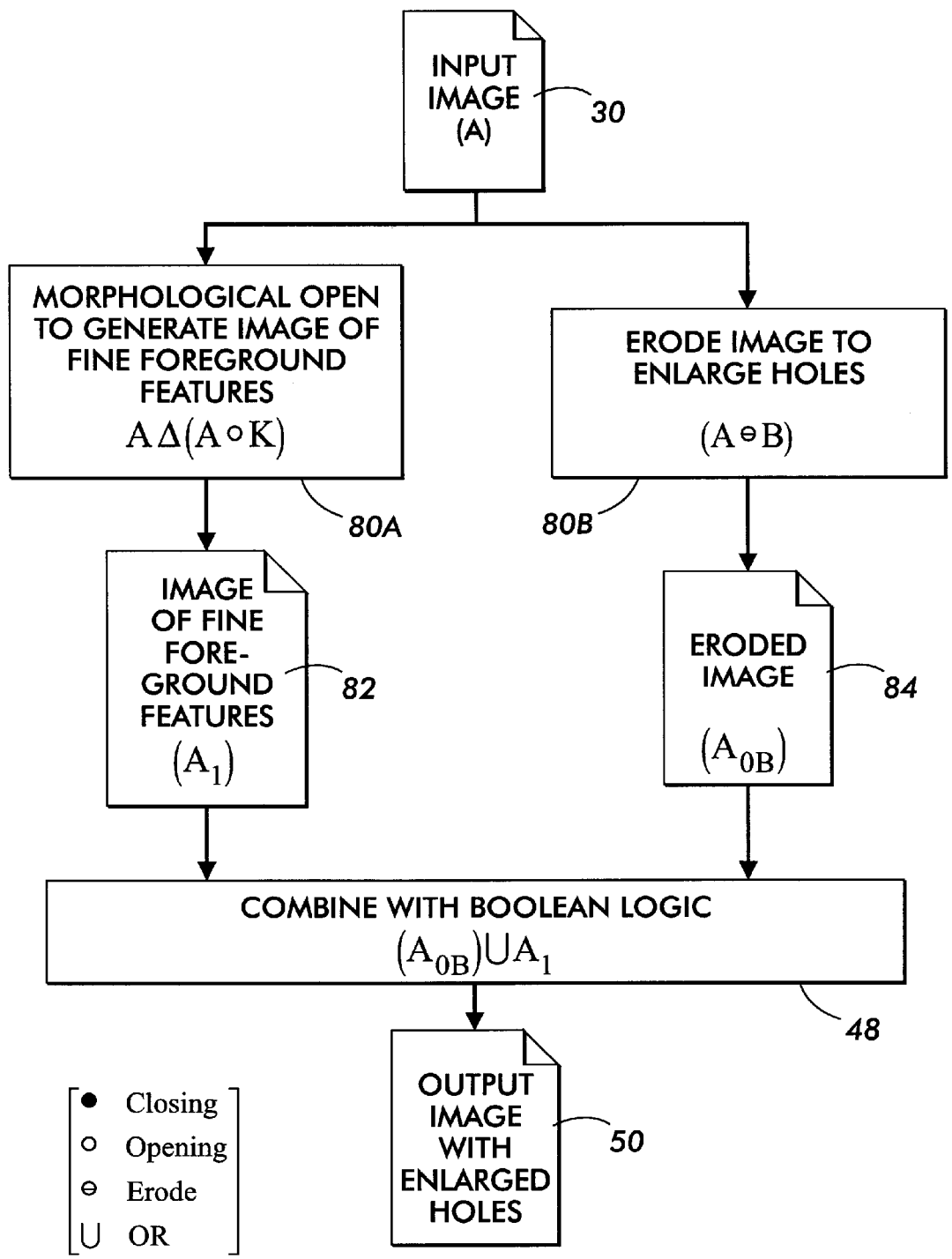
FIG. 8 illustrates an exemplary embodiment of the present invention as designed to isolate only fine foreground image features, thereby eliminating undesirable marking characteristics and blooming artifacts found in marking engines; and, FIG. 9 illustrates the structuring elements required for the operation of the invention as embodied in FIG. 8.
Figure 9:
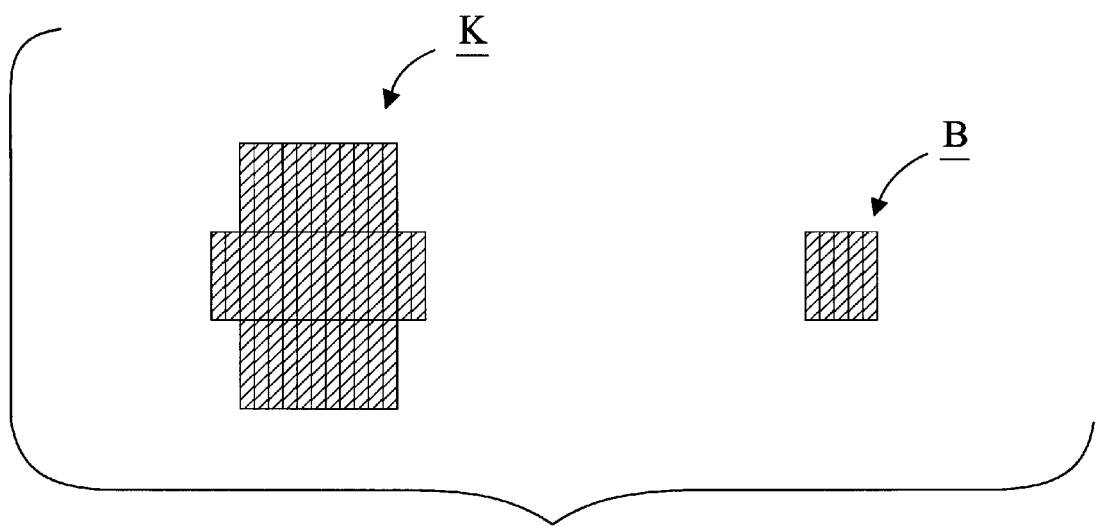

Turning next to FIGS. 8 and 9, there is shown a similar exemplary process and associated structuring elements. In particular, FIG. 8 shows the detail of an alternative method employing opening and eroding operations to isolate fine foreground structures from holes prior to hole growth. Initially input image 30 is morphologically "opened" to remove holes at step 80A. Using the logic represented by the equation $A_1 = A\Delta (A \circ K)$, resultant image 82 is generated using the structuring element K depicted in FIG. 9. In either a subsequent or concurrent fashion, the input image is also morphologically processed to erode the image and thereby enlarge existing holes as represented by step 80B. As indicated by the following logic equation, $A_{OB} = A \ominus B$, the eroded image 84 is created using the structuring element B as illustrated in FIG. 9.

Once both intermediate images 82 and 84 are generated, they are logically OR'ed at step 48 to recombine the intermediate images and thus yield output image 50. Output image 50 will thereby have enlarged holes that are less susceptible to being filled as a result of blooming artifacts caused by an IOI marking engine used to render the image. It should also be noted that, as depicted by the structuring elements of FIGS. 7 and 9, the previously-described processes have particular applicability in a fast-scan, high-addressability (e.g., 4X) marking system, where each pixel consists of four sub-pixels that may be individually controlled so as to produce a high-resolution output.

The hole-growth methods described herein are particularly applicable to a number of image processing display and printer architectures. As mentioned, the hole-growth blooming compensation operations would be performed on an image bitmap after it has been rendered or halftoned to a high-addressability form. The structuring elements shown in FIGS. 7 and 9 may be suitably employed for such an architecture. However, in an alternative architecture, the hole-growth compensation techniques may also be employed on lower resolution, thresholded images, and the affected or modified regions could be merged into a high-addressability version of the image generated by a parallel processing path. For example, a two-channel processing system could be employed, where one channel performs resolution enhancement on high-contrast, saturated structures like line art and text. The holegrowth techniques described herein could be incorporated within the resolution enhancement channel. Such an architecture would be beneficial because the holegrowth blooming compensation operations are particularly suited for improving the printed rendition of high-contrast, saturated edges.

In yet another embodiment, it may be possible to apply analogous processing techniques directly to a multi-bit gray-scale color separation (e.g., 8-bit multi-valued pixels). In such an embodiment, the logic-based OR and AND operations would be replaced with MAX and MIN operations respectively. As is known in the art of morphological image processing, there are gray-scale operations that are equivalent to the binary operations. The ideas described above naturally extend to implementations on gray-scale images via use of gray-scale morphological operators. For instance, a hole in a binary image is defined as a small region of zero-valued pixels surrounded by one-values pixels. A structuring element that finds such a hole is of comparable size and is valued one or zero. For a gray-scale image, a hole may be a small region of low pixel values in a field of pixels possessing higher values. Gray-scale structuring elements would possess a comparable gray-range to the input data and be of comparable size. Upon sieving a gray-scale image for its features of interest, the modifications could be similar to those performed in the binary setting, that is, an increase or decrease in size, and also the modifications may be a change in pixel intensity through a value mapping operations. A summary of such an operation is as follows. Assume the use of gray-scale morphology to identify gray holes. Once identified, the values within the local depression could all be set to chosen value, such as zero. Resetting to such a value results in more contrast in the final image.

As is well known in the art, morphological operations performed alone or in combination can be implemented and represented in various forms, such as Boolean logic, look-up tables, and nonlinear filters. For instance, the above operations may be implemented using sliding window operators and look-up tables. Where a window of pixels are observed about a target and those pixels are used as an index to a look-up table that generates the output signal for that pixel in accordance with the above morphological operations. Further, combinations of the above-described operations may be implemented in various forms, just as multiple Boolean logic equations may be combined and written in various equivalent forms, including truth tables.

In recapitulation, the present invention is a method and apparatus for logic-based image processing of a digital image to compensate for or reduce process artifacts that occur when the image is displayed, or printed by a marking engine such as an image-on-image xerographic engine. In particular, there is described a method for processing a digital image, including the steps of isolating regions of the digital image most likely to be affected by marking artifact, modifying the isolated regions to compensate for the artifact; and merging the modified image with the digital image to produce an output digital image that is artifact reduced when printed using an image on-image marking engine.

It is, therefore, apparent that there has been provided, in accordance with the present invention, a method and apparatus for logic-based image processing. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for processing a digital image, including:
   isolating regions of the digital image including those regions most likely to be affected by an undesirable display or printing artifact;
   producing a modified image by modifying at least one of the isolated regions to compensate for the undesirable display or printing artifact; and
   merging the modified image with the digital image to produce an output digital image that is artifact reduced.

2. The method of claim 1, wherein isolating regions of the digital image most likely to be affected by undesirable printing artifact includes applying a morphological filter to the digital image.

3. The method of claim 1, wherein isolating regions of the digital image most likely to be affected by undesirable printing artifact includes applying a nonlinear filter to the digital image.

4. The method of claim 2, wherein the morphological filter identifies a positive image structure.

5. The method of claim 4, wherein the image structure are fine image features.

6. The method of claim 4, wherein the positive image structure is one of a group of image structures, the group consisting essentially of:
- a horizontal line;
- a vertical line;
- a line at a particular angle;
- a line parallel to the marking process direction;
- a line perpendicular to the marking process direction;
- a line of a particular width;
- a dot; and
- a serif.

7. The method of claim 2, wherein the morphological filter identifies a negative image structure.

8. The method of claim 7, wherein the image structure are fine image features.

9. The method of claim 7, wherein the negative image structure is one of a group of image structures, the group consisting essentially of:
- a horizontal line;
- a vertical line;
- a line at a particular angle;
- a line parallel to the marking process direction;
- a line perpendicular to the marking process direction;
- a line of a particular width;
- a hole; and
- a serif.

10. The method of claim 1, wherein there are a plurality of isolating steps, each isolating step isolating a region within the image containing a particular structure; and
where there is a particular modifying step for each of said particular structures.

11. The method of claim 10, wherein the isolating steps are able to identify positive and negative image structures in parallel.

12. The method of claim 2, wherein applying a morphological filter is as a closing operation.

13. The method of claim 10, wherein the step of modifying the isolated regions includes a dilation operation.

14. The method of claim 2, wherein applying a morphological filter is as an opening operation.

15. The method of claim 2, wherein the step of modifying the isolated region includes an erosion operation.

16. A method for processing a digital image prior to printing, displaying, or storing the image including:
- isolating size dependent regions of the digital image most likely to be affected by an undesirable printing artifact with a morphological filter utilizing a structuring element;
- producing a modified image by modifying at least one of the isolated size dependent regions to compensate for the undesirable printing artifact; and, merging the modified image with the digital image to produce an output digital image that is artifact reduced when printed or displayed.

17. The method of claim 16, wherein the size dependent regions are very small fine features.

18. The method of claim 16, wherein the size dependent regions are holes which are filled in by blooming.

19. The method of claim 16, wherein the structuring element is so chosen as to filter for fine image features.

20. The method of claim 16, wherein the structuring element is so chosen as to filter for one of a group of image structures, the group consisting essentially of:
- a horizontal line;
- a vertical line;
- a line at a particular angle;
- a line parallel to the marking process direction;
- a line perpendicular to the marking process direction;
- a line of a particular width;
- a dot;
- a hole; and
- a serif.

21. A method for processing a digital input image prior to printing, displaying, or storing the image, including:
- isolating feature regions of the digital input image most likely to be adversely affected by a modification operation of an undesirable printing or display artifact;
- modifying the digital input image to produce an modified image; and, merging the isolated feature regions of the digital input image with the modified image to produce an output digital image that is artifact reduced when printed or displayed.

22. The method of claim 21, wherein the digital input image is built of single-bit, zero or one value pixels.

23. The method of claim 21, wherein the digital input image is built of multi-bit, multi-value pixels.

* * * * *